United States Patent
Karakotsios

(10) Patent No.: US 9,075,429 B1
(45) Date of Patent: Jul. 7, 2015

(54) DISTORTION CORRECTION FOR DEVICE DISPLAY

(71) Applicant: Amazon Technologies, Inc., Reno, NV (US)

(72) Inventor: Kenneth Mark Karakotsios, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 390 days.

(21) Appl. No.: 13/719,611

(22) Filed: Dec. 19, 2012

(51) Int. Cl.
*G06F 3/041* (2006.01)
*G06F 3/00* (2006.01)

(52) U.S. Cl.
CPC .............. *G06F 3/005* (2013.01); *G06F 3/0418* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 2011/0102462 A1* | 5/2011 | Birnbaum | 345/647 |
| 2011/0157080 A1* | 6/2011 | Ciesla et al. | 345/174 |

* cited by examiner

*Primary Examiner* — Joseph Haley
(74) *Attorney, Agent, or Firm* — Novak Druce Connolly Bove + Quigg LLP

(57) ABSTRACT

A computing device can implement one or more variable tactile elements (e.g., inflatable buttons/keys) overlaying a touchscreen of the device. The tactile elements can cause distortion to a view of content being displayed on the touchscreen underneath the tactile elements, which can decrease visibility of the content to a viewer (e.g., a user of the device). The device can receive information about the sizes, shapes, and/or locations of the tactile elements. Based on this information, the device can render the content in a manner so as to reduce the distortion caused by the tactile elements. In some embodiments, the device can also determine the device's orientation relative to the user (e.g., using head and/or facial feature tracking, etc.) and render the content to appear substantially undistorted while changes occur to the user's point of view with respect to the device and/or to the device's orientation relative to the user.

18 Claims, 11 Drawing Sheets

DISTORTION CORRECTION FOR DEVICE DISPLAY

BACKGROUND

Computing devices are becoming more commonplace and are used for a wide variety of purposes. Touch sensors and display screens are important components of computing devices. Many computing devices integrate touch sensors and display screens into touch screens that provide a way for users to input commands and instructions. However, a touch screen on a computing device is typically flat and smooth such that a user of the device generally has little or no tactile feedback when typing (e.g., tapping) keys on the touch screen. In some cases, this can cause inconvenience to the user as he/she types on the touch screen. Companies are working on ways to provide tactile feedback with display/touch screens, but varying the shape of the screens leads to optical distortions of the content being displayed. The optical distortions can reduce visibility of the content displayed and reduce overall user experience.

BRIEF DESCRIPTION OF THE DRAWINGS

Various embodiments in accordance with the present disclosure will be described with reference to the drawings, in which.

DETAILED DESCRIPTION

Figure 1:
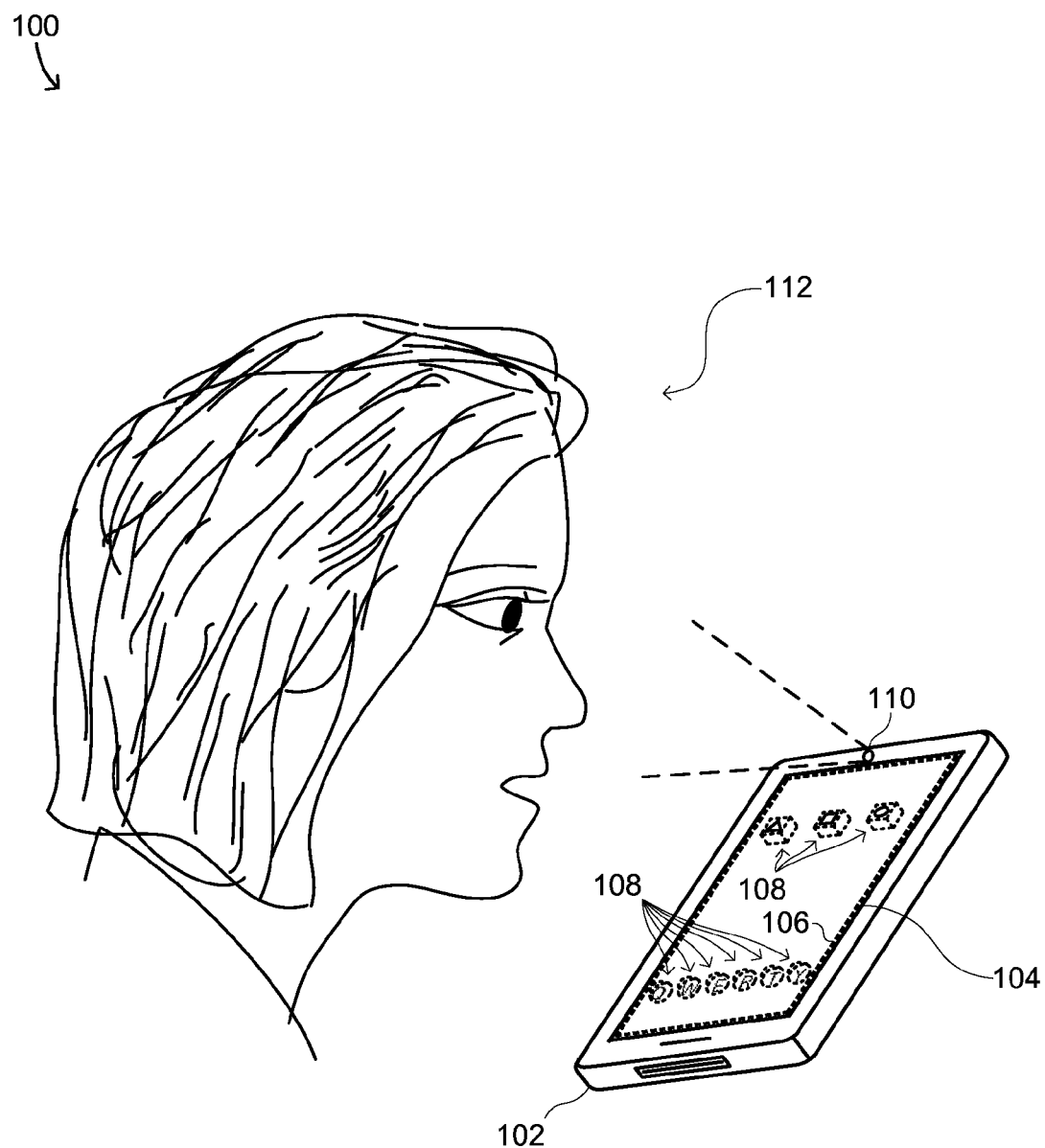
FIG. 1 illustrates an example environment in which aspects of the various embodiments can be utilized.

Systems and methods in accordance with various embodiments of the present disclosure overcome one or more of the above-referenced and other deficiencies in conventional approaches to displaying content on a display. In particular, various embodiments of the present disclosure can provide an approach to correcting distortion of content being displayed on a display of a computing device.

A computing device can implement one or more variable (e.g., inflatable or deformable) tactile elements that overlay, and work in conjunction with, a touch screen of the device. In one example, each of the one or more tactile elements can be substantially transparent and can correspond to a location on the touch screen where a touch screen key or other graphical object can be displayed. The tactile elements can be activated/enabled (e.g., inflated) when the touch screen keys are displayed on the touch screen, such that a user of the device can still see the touch screen keys through the tactile elements but also be provided with the feel of physical buttons via the tactile elements. However, the tactile elements can cause distortion to the content being displayed underneath, due at least in part to the shapes, sizes, locations, and other properties associated with the tactile elements.

At least some embodiments enable the computing device to receive information about the one or more variable (e.g., inflatable or deformable) tactile elements implemented on the computing device. The information about the tactile elements can include the sizes, shapes, locations (with respect to the touch screen), and/or other properties of the tactile elements. Based at least in part on the information, the computing device can determine a rendering of the content that reverses or prevents at least some of the distortion caused by the enabling of the tactile elements. In other words, the computing device can utilize at least some of the information to determine how to render the content such that the content, when viewed through the tactile elements, appears to be (substantially) undistorted from the point of view (i.e., perspective) of the viewer.

In some embodiments, the computing device can modify the rendering of the content to adjust for changes in the point of view of the user, such that the content's rendered appearance remains substantially undistorted (i.e., within an allowable deviation from being undistorted) from the changed/changing point of view of the user. For example, the computing device can determine the device's orientation with respect to the user of the device by tracking the location of the user's head, eyes, and/or another facial feature(s) of the user. In some embodiments, features of the user can include the user's head, eyes, and/or other facial feature(s). Further, the computing device can use one or more sensors (e.g., gyroscope, accelerometer, etc.) and/or acoustic location sensors to facilitate in determining the device's orientation relative to the user. For example, the one or more sensors can be used to determine the orientation of the computing device relative to the user. In another example, acoustic location sensors can use sonar technology to determine the orientation of the computing device relative to the user, by determining where a sound made by the user's mouth came from (and thus determining a location for the user's mouth and head). Based at least in part on the device's orientation, the device can render the content such that the content remains to appear substantially undistorted while changes occur to the user's point of view (with respect to the device) and/or the device's orientation.

Various other functions and advantages are described and suggested below as may be provided in accordance with the various embodiments FIG. 1 illustrates an example environment 100 in which aspects of the various embodiments can be utilized. The example environment 100 can comprise a computing device 102, which can include a display 104 (i.e., display screen) and an interface layer 106. The display 104 can work in conjunction with and/or be integrated with a touch sensor. For example, the display 104 can be a touch screen. Also, in some embodiments, the interface layer 106 can overlay the display 104. In one example, the interface layer 106 can replace a window or cover glass over the display 104 of the computing device. In some embodiments, the interface layer 106 can be integrated with the display 104.

Furthermore, as shown in FIG. 1, the interface layer 106 can comprise one or more variable tactile elements 108. In some embodiments, the one or more variable tactile elements 108 can be one or more inflatable tactile elements 108. The inflatable tactile elements 108 can be filled with a specified material, such as a liquid, semiliquid, or gaseous material (e.g., air). When the computing device 102 so decides, the device 102 can send signals to the interface layer 106 to enable or disable the tactile elements 108, thereby making the elements 108 variable. For example, for one or more inflatable tactile elements 108, the device 102 can send signals to the interface layer 106 to inflate the inflatable tactile elements 108 and to deflate the inflatable tactile elements 108.

The variable tactile elements can be utilized to provide the feel, tangibility, and/or tactility of physical buttons/keys on a physical keyboard/keypad, without substantially taking away from the advantages of a flat and/or smooth touch screen surface. For example, the computing device 102 can activate/enable (e.g., inflate, make rise, etc.) the tactile elements to correspond to a keyboard being presented on the touch screen and can disable (e.g., deflate, recede, etc.) the tactile elements when the keyboard is no longer needed, such that the flatness/smoothness/seamlessness of the display is maintained.

Moreover, the tactile elements (e.g., "buttons", "keys", "bubbles", etc.) can be customized/configured in size, shape, location, layout, etc., prior to the manufacturing of an interface layer. For example, the tactile elements can be customized/configured to be located at locations (e.g., with respect to a display/touch screen) where keys of a touch screen keyboard are typically rendered, such that each tactile element corresponds to each key. When a user taps on a key of the touch screen keyboard, the user can feel the tangibility of a physical button due to the tactile element and the touch screen can still sense the user's tap without interference by tactile element. As such, the user can rest his/her fingertips on the buttons without triggering key presses and then press down onto the touch screen when he/she decides to enter a key press.

However, at least in some cases, the tactile elements, when activated/enabled (e.g., inflated) can cause optical distortion to content being displayed under the tactile elements. For example, text, images (including video), and other visible content under each tactile element can be distorted by a respective tactile element when inflated. Various embodiments of the present disclosure can be implemented to address this concern.

Moreover, as shown in FIG. 1, the computing device 102 can comprise at least one camera 110. The at least one camera 110 can be a front-facing camera of the computing device 102. In some embodiments, the at least one camera 110 can capture one or more images including at least a portion of a user 112 of the computing device. The one or more images captured by the camera 110 can be utilized for tracking the location of the head of the user 112, the eye(s) of the user 112, and/or other facial features of the user 112, which can be useful in determining an orientation of the device 102 with respect to (e.g., relative to) the user 112. In some embodiments, reducing (e.g., eliminating) the distortion caused by the tactile elements 108 can depend at least in part on the orientation of the device 102 with respect to the user 112 (e.g., relative to the point of view or perspective of the user 112).

Furthermore, although FIG. 1 shows only a particular number of tactile elements 108 with particular shapes and sizes and at particular locations with respect to the display 104, it is contemplated that there can be various quantities of tactile elements 108 with various shapes, sizes, locations, etc.

Figure 2A:
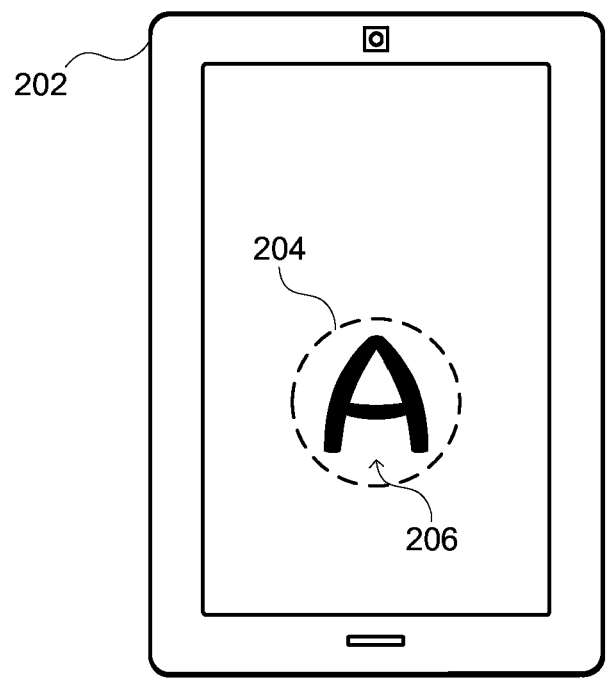
FIG. 2A illustrates an example computing device embodiment in which distortion correction for device display can be implemented.
Figure 2A:
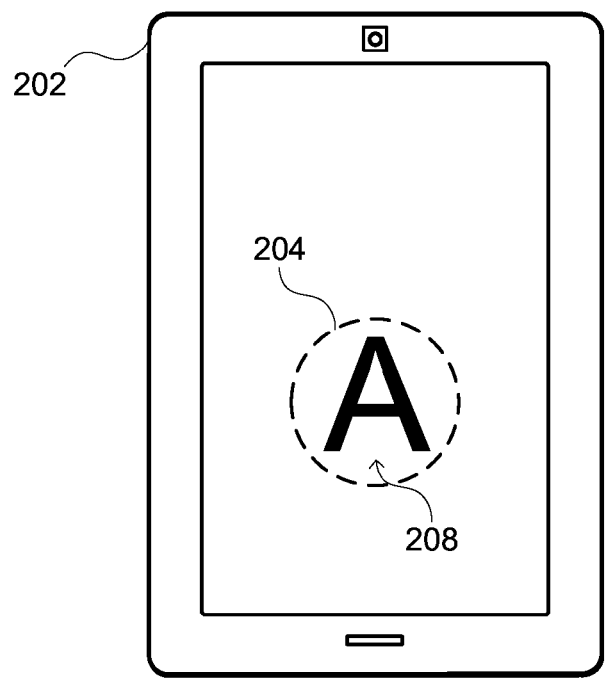

FIG. 2A illustrates an example computing device embodiment 202 in which distortion correction for device display can be implemented. In FIG. 2A, a variable tactile element 204 with a particular size, shape, and location is shown on the example computing device 202. This is for illustrative purposes only. It is contemplated that there can be various quantities of variable tactile elements at various sizes, shapes, locations, etc.

As discussed previously, content can be distorted by an activated/enabled (e.g., inflated) tactile element. For example, as shown in FIG. 2A, the inflated tactile element 204 can cause content 206 rendered on the display to be distorted. In this example, the inflated tactile element 204 has a shape similar to that of half a sphere or that of a plano-convex lens. As such, the content 206 underneath/behind the inflated tactile element 204 can have a substantially radial distortion (i.e., centering distortion).

In order to reduce (e.g., eliminate) the distortion, various embodiments of the present disclosure can receive information about variable tactile elements on the computing device 202, which can indicate to the device 202 (e.g., to applications running on the device 202) the locations, sizes, shapes, etc., of the variable tactile elements. Based at least in part on the information about the variable tactile elements, the device 202 (e.g., an app on the device 202) can determine how to render and display the content such that the distortion to the content caused by the variable tactile elements is reduced.

Continuing with the previous example, the inflated tactile element 204 causes the content 206 to be radially distorted. In some embodiments, the computing device 102 (e.g., an app on the device 102) can determine how to render the content using a distortion correction algorithm. For this example, the distortion correction algorithm can be a radial distortion correction algorithm. The radial distortion correction algorithm can be based at least in part on a lens distortion model, such as Brown's distortion model, because the inflated tactile element 204 has a shape similar to that of a plano-convex lens. In some embodiments, lens distortion models can characterize both radial distortion and for tangential distortion caused by physical elements in a lens not being perfectly aligned. The radial distortion correction algorithm can correct at least a portion of the distortion based on which lens distortion model is applicable. Examples of lens distortion models can include Brown's distortion model or the Brown-Conrady distortion model. The device 202 can warp the content 206 with an inverse distortion (i.e., reverse distortion) to reduce the distortion caused by the inflated tactile element 204. In other words, the rendering of the shape of the content can be manipulated to reverse the effects of the distortion. For example, the content can be represented by a plurality of pixels and the optical distortion to the content distorts a subset of the plurality of pixels (e.g., 206). The device 202 can determine new positions for the distorted subset of pixels at which the subset is to be rendered thereby resulting in the subset being undistorted (i.e., substantially undistorted) (e.g., 208). Accordingly, the otherwise would-be distorted content 206 can be rendered as being undistorted 208.

In some embodiments, there can be a default way/manner in which to render the content in order to reduce distortion caused by the tactile elements. In one example, the default rendering can adjust (e.g., reduce) for distortion with the presumption that the viewing angle of the user (i.e., the user's point of view/perspective) is within an allowable deviation from being straight at the front face of the device 202, as shown in FIG. 2A. However, in some embodiments, the computing device can take into account its orientation with respect to the user and adjust the rendering based on changes to the device orientation relative to the user, as shown in FIG. 2B and FIG. 2C.

Figure 2B:
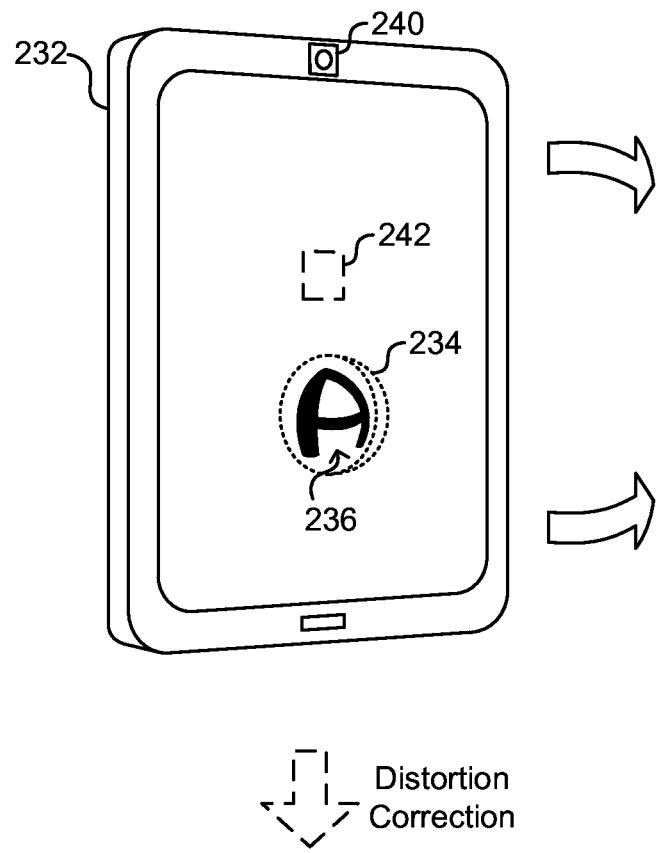
FIG. 2B illustrates an example user perspective of an example computing device embodiment in which distortion correction for device display can be implemented.
Figure 2B:
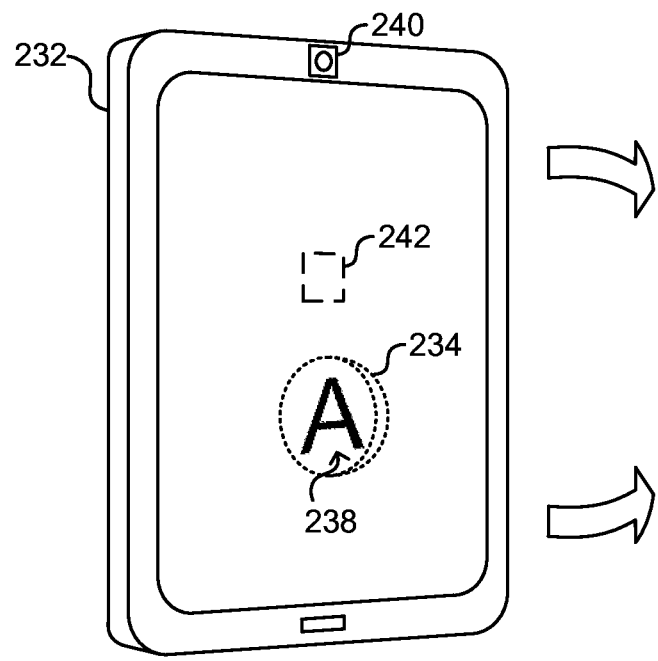
Figure 2C:
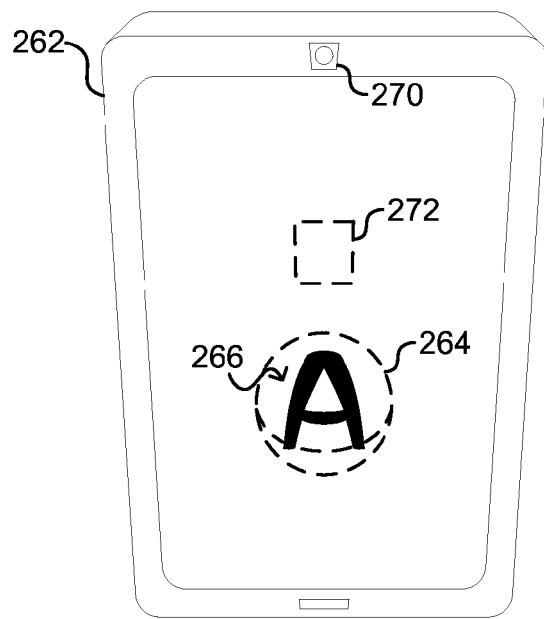
FIG. 2C illustrates an example user perspective of an example computing device embodiment in which distortion correction for device display can be implemented.
Figure 2C:
Figure 2C:
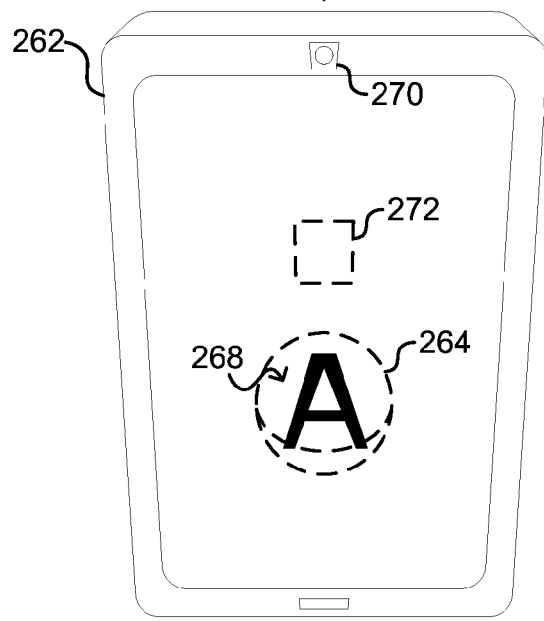
Figure 2C:

FIG. 2B illustrates an example user perspective of an example computing device embodiment 232 in which distortion correction for device display can be implemented. FIG. 2B shows an example perspective (i.e., point of view) of the user of the device 232, wherein the user is looking at the device 232 when the device 232 has been tilted to the right (i.e., the right side of the device 232 has been tilted away from the user). From this example point of view of the user, the device 232 is at a particular orientation relative to the user. At this particular orientation of the device 232 relative to the user, the inflated tactile element 234 on the device 232 is causing a particular distortion to the content 236 being displayed. The particular distortion can be dependent on the particular orientation of the device 232 with respect to the user. As such, when the device 232 attempts to reduce the distortion to the content 236, the device 232 can take into account the orientation of the device 232 with respect to the user.

The computing device 232 can determine its orientation with respect to the user. As shown in FIG. 2B, the device 232 can comprise at least one camera 240, such as a front-facing camera. The at least one camera 240 can capture one or more images which includes at least a portion of the user's head. In some embodiments, the one or more images can also include at least one eye of the user. In some embodiments, the one or more images can also include at least one other facial feature of the user (e.g., nose, mouth, etc.). The device 232 can determine a location of the user's head, eyes, and/or another facial feature(s) using the one or more images. The device 232 can thus track the head, eyes, and/or another facial feature(s) of the user and determine the device's orientation with respect to the user. Thus, the device can take into account the device's orientation relative to the user and determine how to render the otherwise would-be distorted content 236 to appear to be undistorted (i.e., substantially undistorted) 238 from the user's point of view. The device can also detect changes in the orientation and modifying the rendering accordingly.

In some embodiments, the device 232 can utilize at least in part one or more orientation sensors 242 to facilitate in the determining the device's orientation with respect to the user. For example, one or more gyroscopes and/or accelerometers can be utilized at least in part to determine the device's orientation (and changes to the orientation) with respect to the user.

Although FIG. 2B shows the device 232 being tilted to the right, this is for illustrative purposes only. It is contemplated that the device 232 can be tilted to the left as well, and/or tilted up or down, as shown in FIG. 2C.

FIG. 2C illustrates an example user perspective of an example computing device embodiment 262 in which distortion correction for device display can be implemented. FIG. 2C shows an example perspective (i.e., point of view) of the user of the device 262, wherein the user is looking at the device 262 when the device 262 has been tilted down (i.e., the bottom side of the device 262 has been tilted away from the user). From this example point of view of the user, the device 262 is at a particular orientation relative to the user. At this particular orientation of the device 262 relative to the user, the inflated tactile element 264 on the device 262 is causing a particular distortion to the content 266 being displayed. The particular distortion can be dependent on the particular orientation of the device 262 with respect to the user. So when the device 262 attempts to reduce the distortion to the content 266, the device 262 should take into account the orientation of the device 262 with respect to the user.

The example device 262 in FIG. 2C can comprise at least one camera 270 and at least one orientation sensor 272, each of which is configured to facilitate in determining the orientation of the device 262 with respect to the user. As such, the device 262 can take into consideration the device orientation relative to the user and determine the way/manner in which to render the content such that the content appears to be undistorted 268 from the user's point of view.

Moreover, although FIG. 2C shows the device 262 being tilted downward, this is for illustrative purposes only. It is contemplated that the device 262 can be tilted upward as well, and/or tilted left or right, as previously shown in FIG. 2B.

Figure 3:
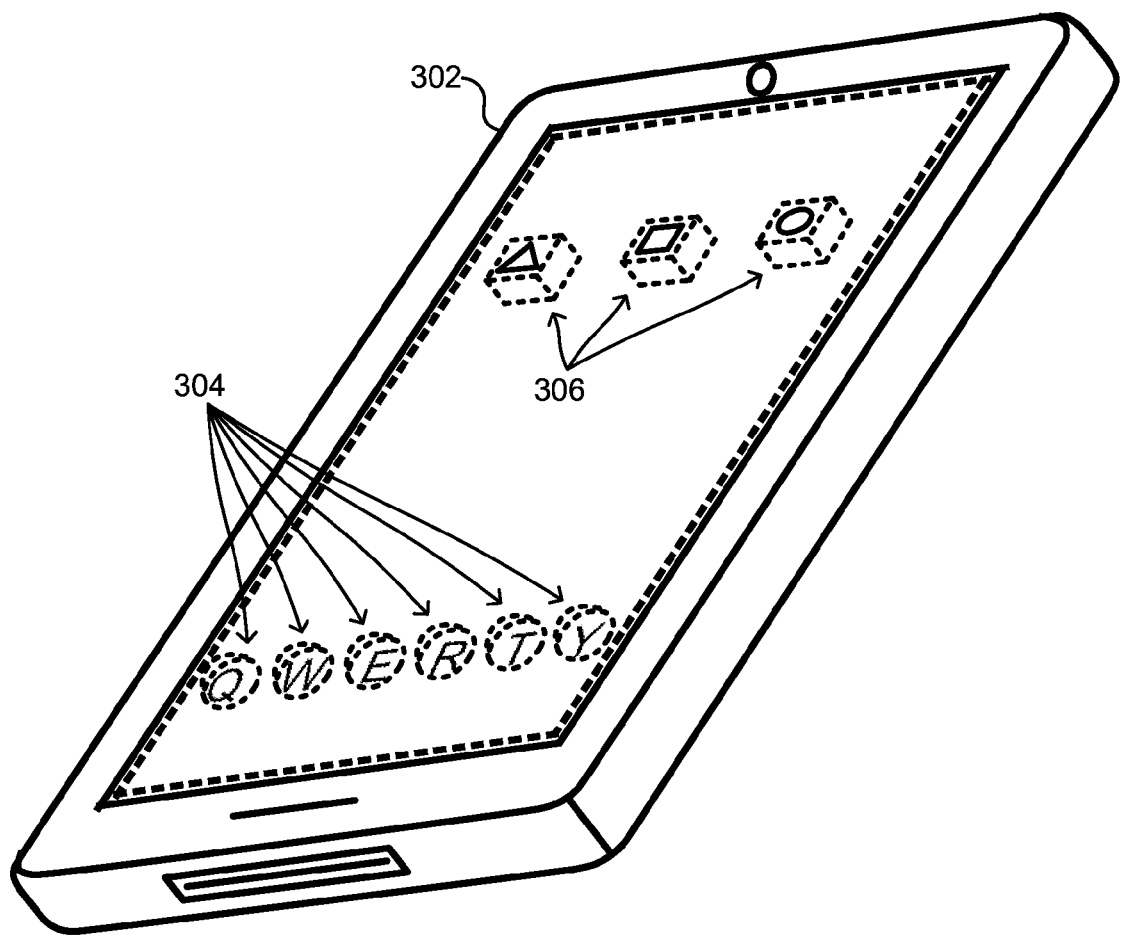
FIG. 3 illustrates an example computing device embodiment in which distortion correction for device display can be implemented.

FIG. 3 illustrates an example computing device embodiment 302 in which distortion correction for device display can be implemented. FIG. 3 shows example variable tactile elements (e.g., 304, 306) that can be implemented on the example device 302. In some embodiments, there can be spherically shaped (e.g., plano-convex lens) variable tactile elements 304. In some embodiments, there can be rectangular shaped (e.g., cubic) variable tactile elements 304.

Moreover, there can be various quantities of variable tactile elements (e.g., 304, 306) implemented on the example device 302. The variable tactile elements (e.g., 304, 306) can not only have different shapes, but they can also differ in size and location (e.g., location on the display/touch screen). As such, two different variable tactile elements can cause different distortions to the content displayed underneath. In addition, other factors such as the color(s), the fill material(s), etc., of the variable tactile elements can also be factors that determine what distortion the variable tactile elements will cause. Accordingly, the device 302 has to utilize at least a portion of the information about (e.g., properties of) the variable tactile elements (e.g., 304, 306) in order to properly reduce distortions caused by them. In order words, in order to properly render content to appear undistorted, the rendering must be based at least in part on a portion of the information (e.g., size, color, shape, location, fill material, etc.) of the variable tactile elements.

In some embodiments, the device 302 (e.g., apps on the device 302) can receive information about the variable tactile elements (e.g., 304, 306) prior to the rendering of the content to appear to be undistorted. For example, the device 302 can be configured to have access to information about the variable tactile elements (e.g., 304, 306) during a set-up and/or initialization process. In another example, the information about the variable tactile elements can be included with (e.g., hard-coded into) during a device manufacturing process.

Figure 4:
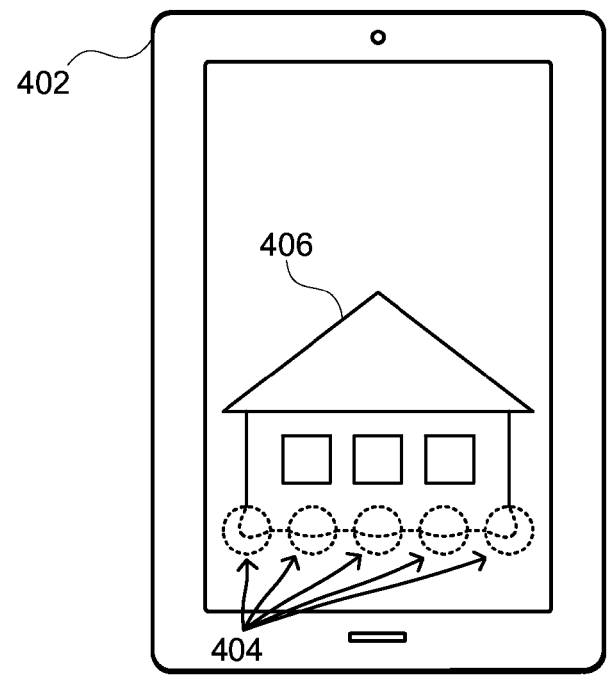
FIG. 4 illustrates an example computing device embodiment in which distortion correction for device display can be implemented.
Figure 4:
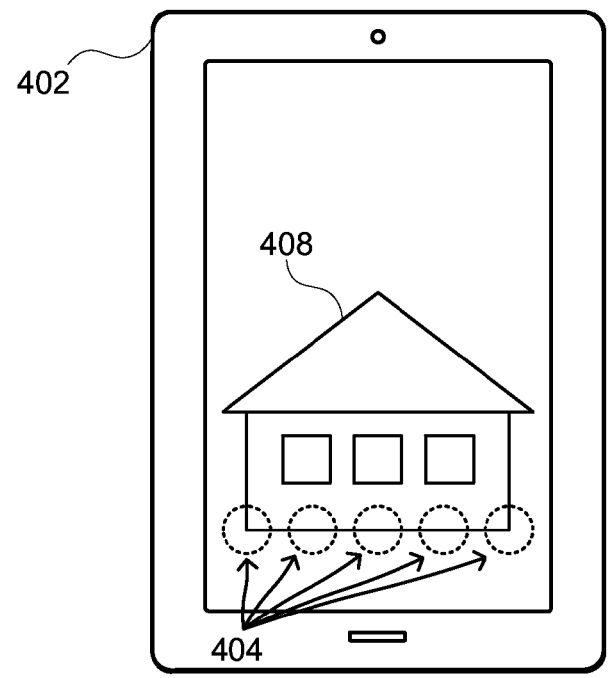

FIG. 4 illustrates an example computing device embodiment 402 in which distortion correction for device display can be implemented. In FIG. 4, variable tactile elements 404 are causing distortion to an image 406 being displayed on the device. As discussed above, the content being displayed on the device 402 can include any visible content, such as text, image (including video), three-dimensional models, etc., or any combination thereof. The device 402 can determine how to render the otherwise would-be distorted image 406 to appear to be undistorted 408.

Figure 5:
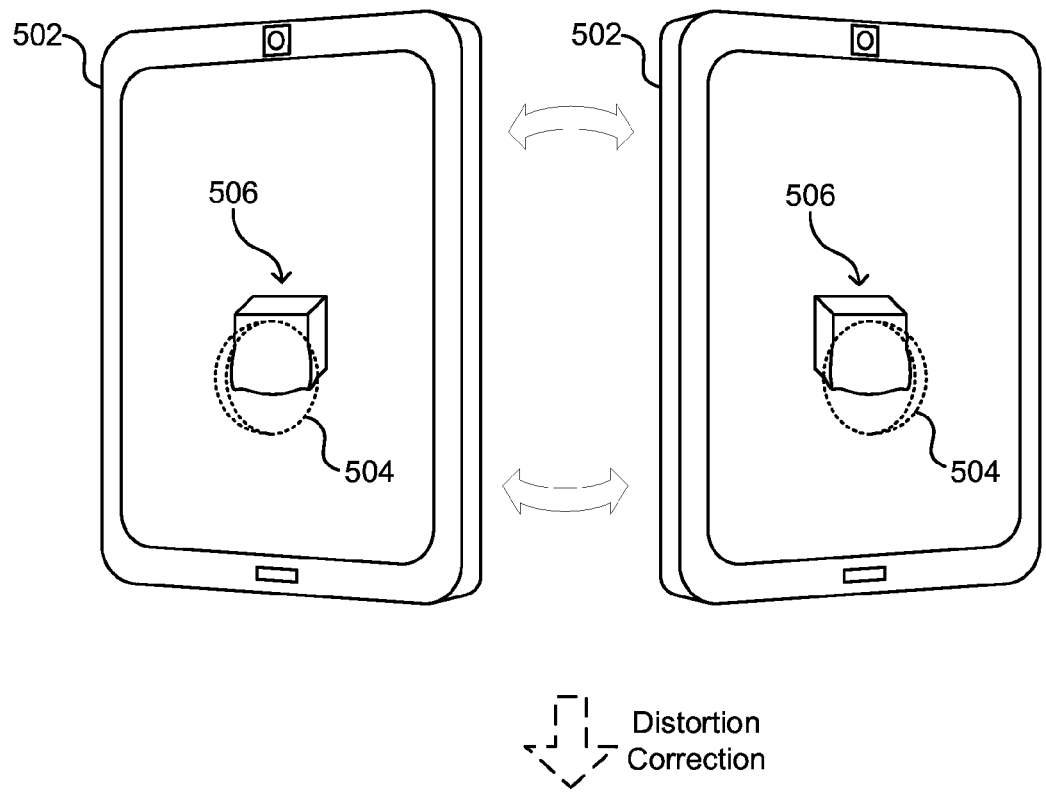
FIG. 5 illustrates example user perspectives of an example computing device embodiment in which distortion correction for device display can be implemented.
Figure 5:
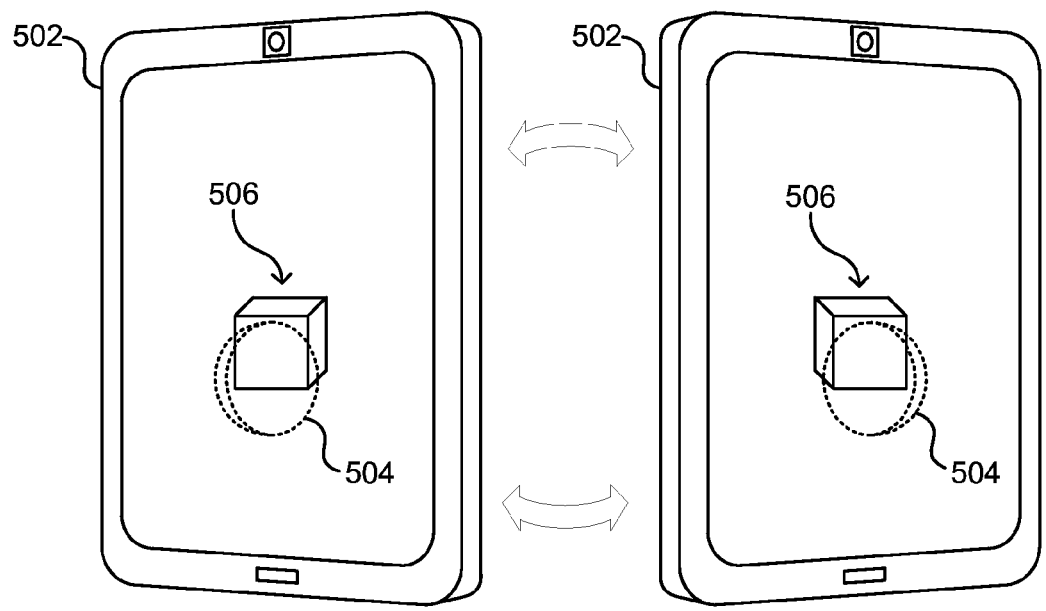

FIG. 5 illustrates example user perspectives of an example computing device embodiment 502 in which distortion correction for device display can be implemented. FIG. 5 shows an example computing device 502 that is generating an example three-dimensional model/rendering/representation 506 based on user position tracking. In FIG. 5, the device 502 can track the location of the user's head, the eyes, and/or other facial feature(s) of the user and render an object to appear three-dimensional as the user moves the devices. For example, the device 502 can be tilted left or right (as illustrated in FIG. 5), such that the right and left sides of the object can be displayed, respectively. It is also contemplated that the device can be tilted up and down (not illustrated in FIG. 5), such that the bottom and top sides of the object can be displayed, respectively.

However, in FIG. 5, the variable tactile element 504 on the device 502 is causing the three-dimensional object to be distorted 506. In order to reduce the distortion, the device 502 can determine how to render the otherwise would-be distorted three-dimensional object 506 to appear to be undistorted 508.

Figure 6A:
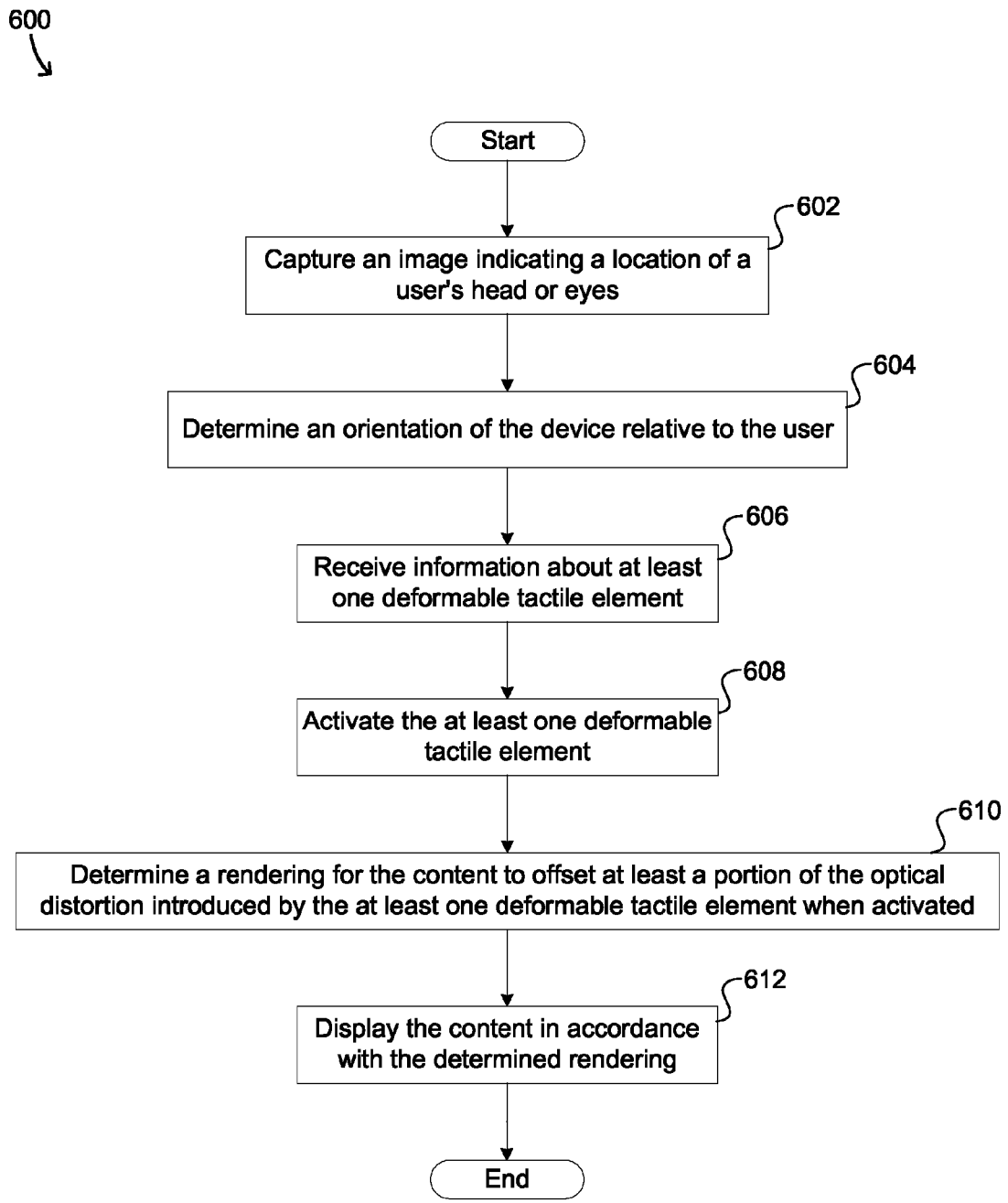
FIG. 6A illustrates an example method embodiment for distortion correction for device display.

FIG. 6A illustrates an example method embodiment 600 for distortion correction for device display. It should be understood that there can be additional, fewer, or alternative steps performed in similar or alternative orders, or in parallel, within the scope of the various embodiments unless otherwise stated. The example method embodiment 600 can start with capturing one or more images using at least one camera of a computing device, at step 602. The one or more images can indicate at least one of a location of a head of a user of the computing device, eyes, and/or another facial feature(s) of the user. At step 604, the example method 600 can determine an orientation of the computing device relative to the user based at least in part on at least one of the location of the head, the eyes, and/or another facial feature(s). Step 606 can include receiving information about at least one deformable tactile element overlaying a display of the computing device. The information can indicate at least one of a location, a size, or a shape of the at least one deformable tactile element. The method 600 can activate the at least one deformable tactile element, at step 608. The at least one deformable tactile element, when activated, can introduce an optical distortion to a view of content being displayed on the display. The method 600 can determine a rendering for the content to offset at least a portion of the optical distortion introduced by the at least one deformable tactile element when activated, at step 610. The determining can be based at least in part on a distortion correction algorithm that utilizes at least information about the orientation of the computing device, relative to the user, and the information about the at least one deformable tactile element. Step 612 can include displaying the content in accordance with the determined rendering.

Figure 6B:
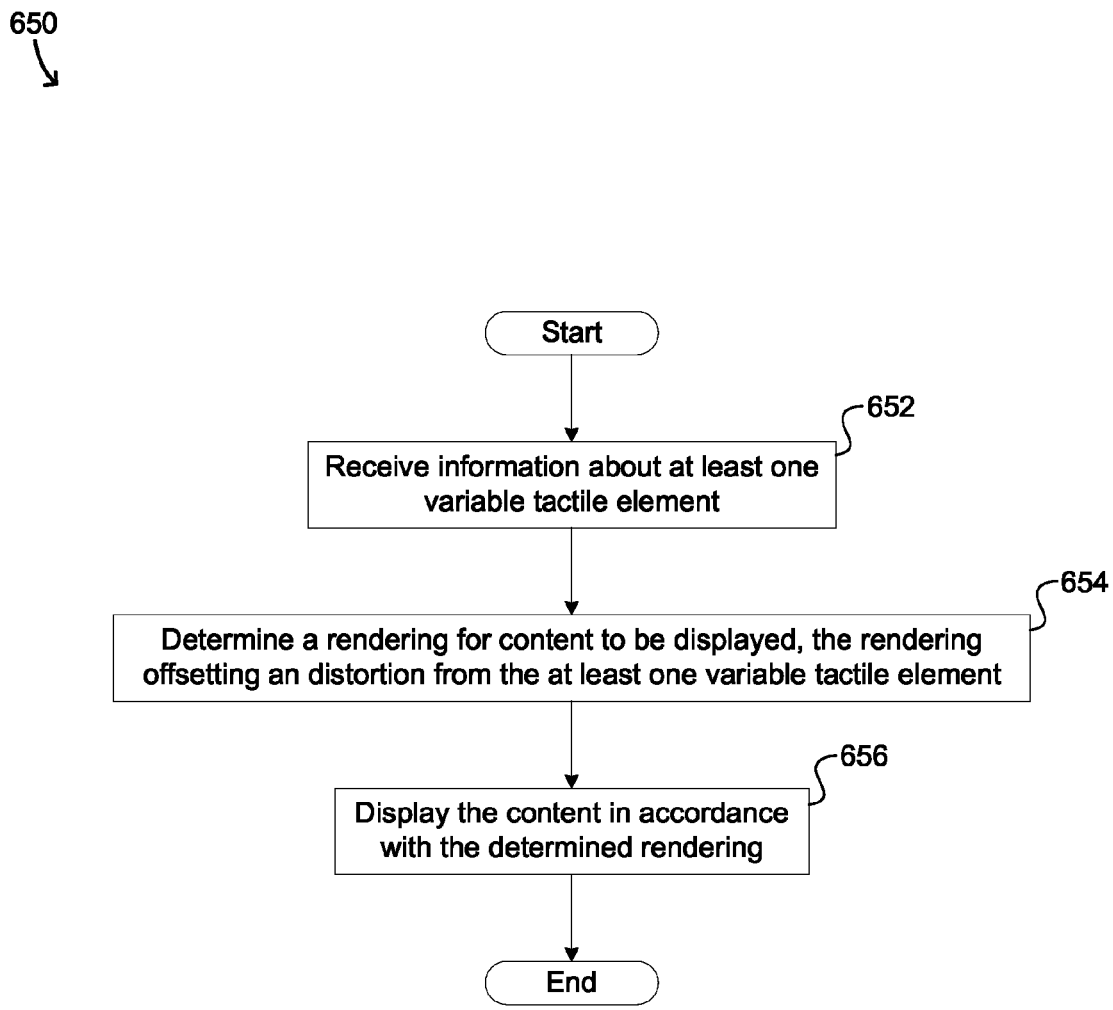
FIG. 6B illustrates an example method embodiment for distortion correction for device display.

FIG. 6B illustrates an example method embodiment 650 for distortion correction for device display. Again, it should be understood that there can be additional, fewer, or alternative steps performed in similar or alternative orders, or in parallel, within the scope of the various embodiments unless otherwise stated. At step 652, the example method embodiment 650 can receive information about at least one variable tactile element associated with a display of a computing device. The information can indicate at least one of a location, a size, or a shape of the at least one variable tactile element. The method 650 can determine a rendering for content to be displayed, at step 654. The rendering can offset at least a portion of an optical distortion introduced by the at least one variable tactile element when activated. The determining can be based at least in part the information about the at least one variable tactile element. Step 656 can include displaying the content in accordance with the determined rendering.

In some embodiments, the optical distortion to the content caused by the variable tactile elements can include at least one of a barrel distortion (in which image magnification decreases with distance from the optical axis), a pincushion distortion (in which image magnification increases with the distance from the optical axis), a mustache distortion (in which the distortion starts out as barrel distortion close to the image center and gradually turns into pincushion distortion towards the image periphery), a tangential distortion (e.g., non-radial distortion), or a perceptive distortion (distortion in how an object is visually perceived). In some embodiments, when the optical distortion includes tangential distortion, then determining how to render content to reduce distortion can be based at least in part on the Brown-Conrady distortion model.

In some embodiments, variable tactile elements can be inflatable tactile elements. The inflatable tactile elements can be fillable/inflatable with a specified material (i.e., fill material). For example, the specified material can be a liquid material (e.g., water-based solution), a semiliquid material (e.g., composite mixture), and/or a gaseous material (e.g., air). Accordingly, determining how to render to content to appear to be undistorted can depend at least in part on the specified material that fills/inflates the inflatable tactile elements.

In some embodiments, the determining of the orientation of the device with respect to the user can utilize at least in part one or more microphones (e.g., a microphone array). For example, the one or more microphones can be configured to acoustically locate the position of the user (e.g., the mouth, and thus head, of the user) based on a voice, utterance, etc., by the user.

Various embodiments consistent with the present disclosure can also be implemented to take into consideration the environment in which the device is situating. In some embodiments, the device can detect that there is a reflection (e.g., an amount of reflection exceed a reflection amount threshold) caused by a variable tactile element, such that the visibility of the content is reduced by the reflection. The device can thus modify the rendering of the content to reduce the amount of reflection. For example, the device can modify (e.g., increase, decrease, etc.) at least one of a contrast level associated with the content, a brightness level associated with the content, a display size associated with the content, etc. Moreover, in some embodiments, the device can take into account the background lighting condition associated with the environment in which the computing device is situated. For example, the device can detect/determine/identify the background lighting condition and modify the rendering (e.g., increase/decrease brightness, contrast, etc.) of the content based on the background lighting condition. Further, in some embodiments, the device can determine an amount in which to activate/enable (e.g., inflate, make rise, etc.) and disable (e.g., deflate, recede, etc.) the tactile elements. For example, in a well-lit environment, the tactile elements need not be fully inflated/made risen because the keys on the display/touch screen can be fairly visible to the user; however, in a dark environment, the tactile elements can be fully inflated/made risen because the keys on the display/touch screen can be more difficult for the user to see.

Figure 7:
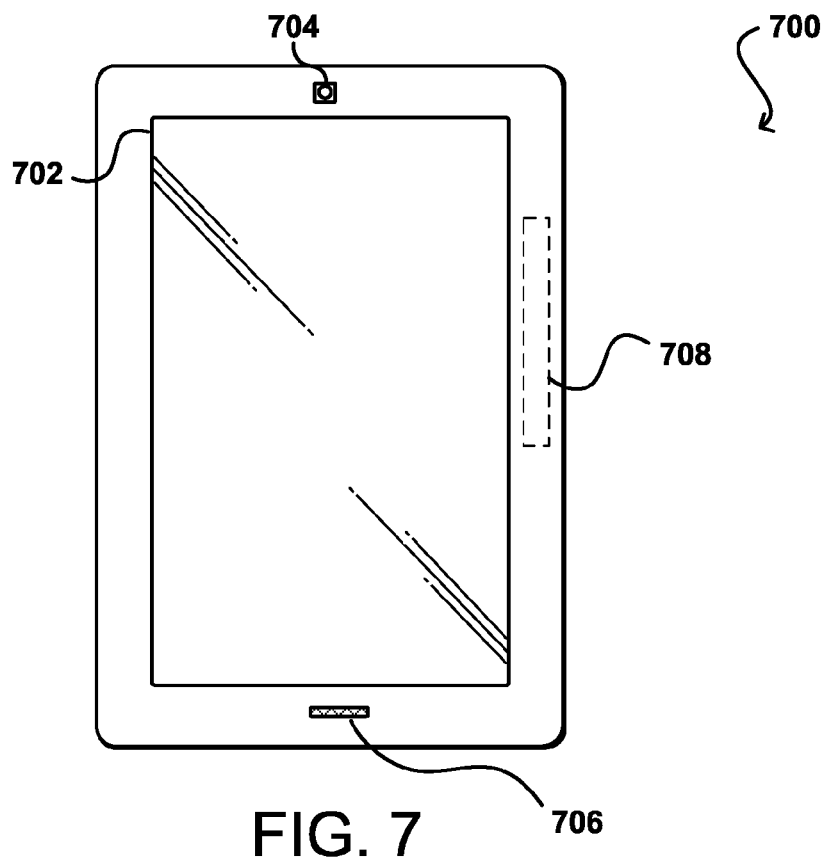
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
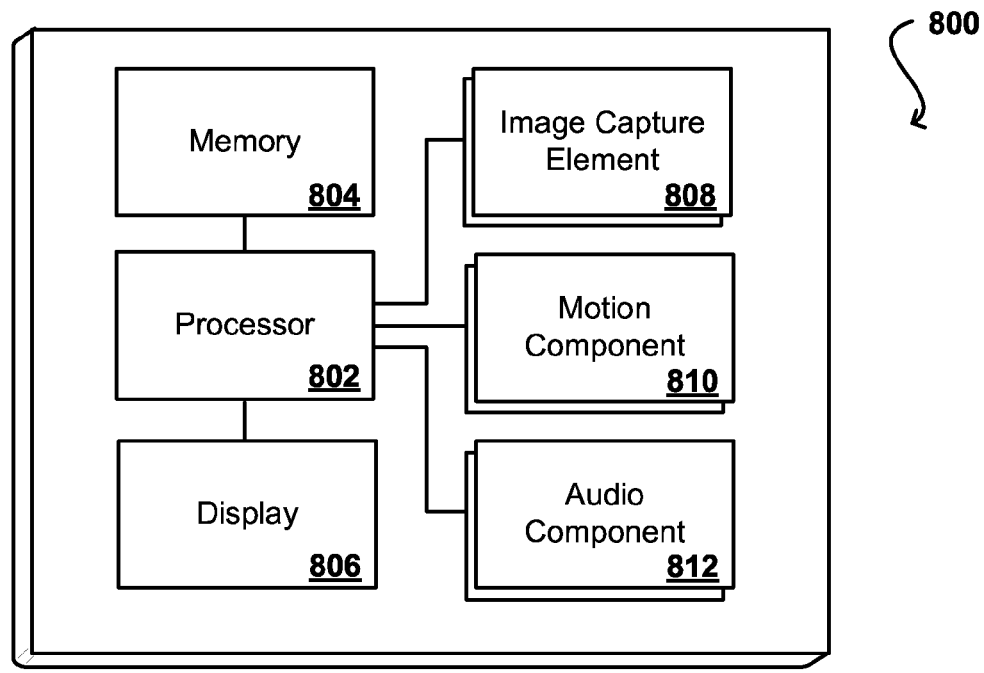
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
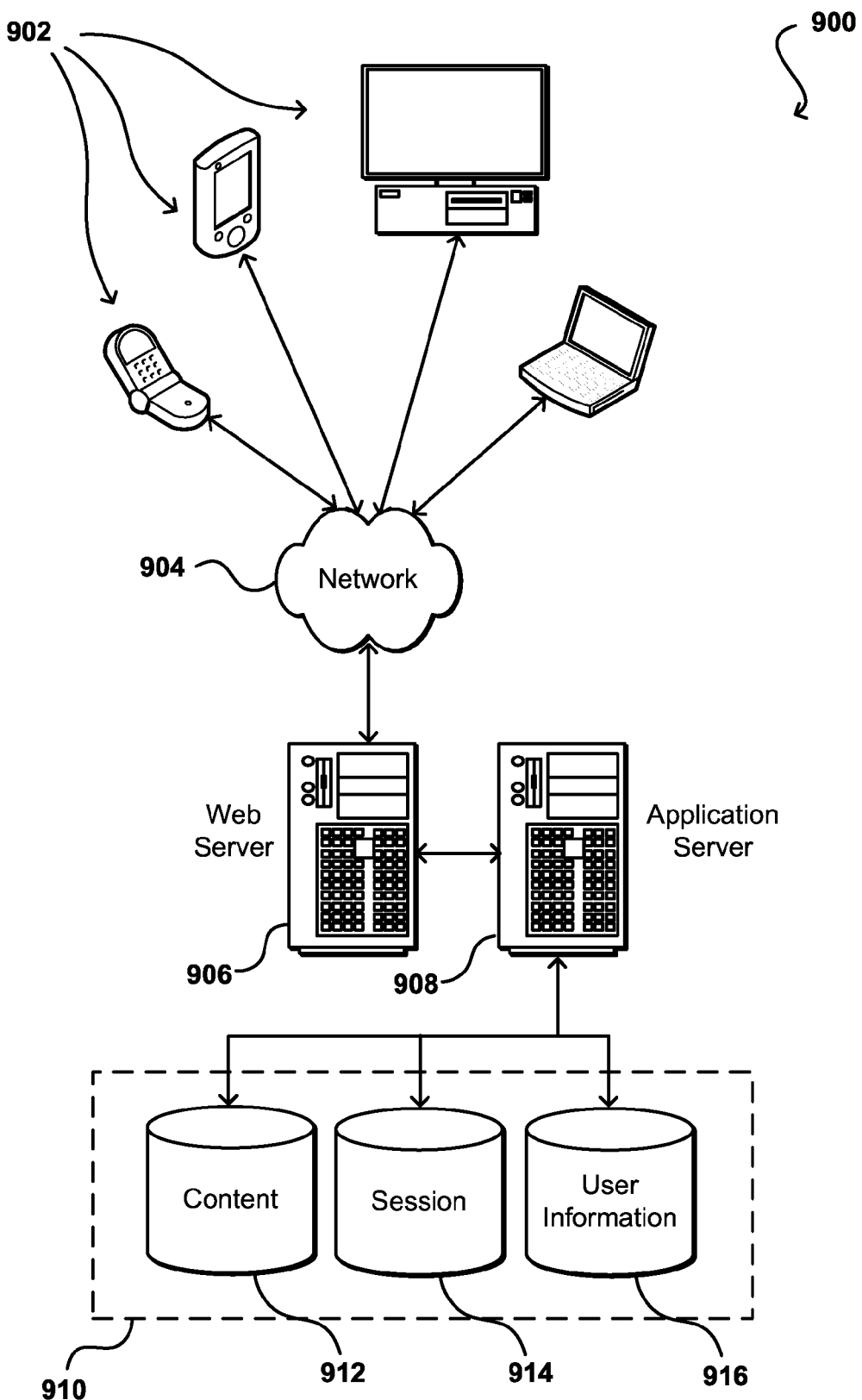
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for distortion correction for device display, comprising:
    capturing one or more images using at least one camera of a computing device, the one or more images including at least one of a head or a facial feature of a user of the computing device;
    determining an orientation of the computing device relative to the user using at least in part the one or more images including the at least one of the head or the facial feature;
    accessing information about at least one deformable tactile element overlaying a display of the computing device, the information indicating at least one of a location, a size, or a shape of the at least one deformable tactile element;
    activating the at least one deformable tactile element, wherein the at least one deformable tactile element, when activated, causes an optical distortion to appear with respect to content to be displayed using the display; and
    displaying the content to correct at least a portion of the optical distortion, the displaying being based at least in part on a distortion correction algorithm that utilizes at least the orientation of the computing device, relative to the user, and the information about the at least one deformable tactile element.

2. The computer-implemented method of claim 1, further comprising:
    determining orientation information using one or more sensors of the computing device, wherein the determining the orientation of the computing device relative to the user uses at least in part the determined orientation information.

3. The computer-implemented method of claim 1, wherein the optical distortion includes at least one of a barrel distortion, a pincushion distortion, a mustache distortion, a tangential distortion, or a perceptive distortion.

4. The computer-implemented method of claim 1, wherein the displaying the content to correct the at least the portion of the optical distortion further comprises applying an inverse distortion to the content to offset the at least the portion of the optical distortion.

5. The computer-implemented method of claim 1, wherein the distortion correction algorithm is based at least in part on a lens distortion model.

6. A computer-implemented method comprising: accessing information about at least one variable tactile element associated with a display of a computing device, the information indicating at least one of a location, a size, or a shape of the at least one variable tactile element; and displaying content to correct for at least a portion of an optical distortion caused by the at least one variable tactile element when activated, and the displaying being based at least in part on the information about the at least one variable tactile element; determining an orientation of the computing device with respect to a user of the computing device, the determining the orientation using at least one of a camera of the computing device to track a position of a feature of the user, an acoustic location sensor to acoustically locate the position of the head of the user, or a sensor to capture orientation information about the computing device, and wherein the displaying the content to correct for the at least the portion of the optical distortion is further based in part on the orientation of the computing device.

7. The computer-implemented method of claim 6, wherein the displaying the content to correct for the at least the portion of the optical distortion is based at least in part on a distortion correction algorithm.

8. The computer-implemented method of claim 7, wherein the distortion correction algorithm is based at least in part on a lens distortion model, the lens distortion model being associated with at least one of Brown's distortion model or Brown-Conrady's distortion model.

9. The computer-implemented method of claim 6, wherein the information about the at least one variable tactile element further indicates that the at least one variable tactile element is at least one inflatable tactile element fillable with a specified material.

10. The computer-implemented method of claim 9, wherein the information about the at least one variable tactile element further indicates that the specified material is at least one of a liquid material, a semiliquid material, or a gaseous material.

11. The computer-implemented method of claim 6, further comprising:
determining an amount of change to the orientation of the computing device with respect to the user; and
modifying the displaying the content based on the amount of change to the orientation of the computing device.

12. The computer-implemented method of claim 6, further comprising:
determining an amount of reflection caused at least in part by the at least one variable tactile element, the amount of reflection reducing visibility of the content; and
modifying the displaying the content to offset at least a portion of the amount of reflection.

13. The computer-implemented method of claim 12, wherein the modifying the displaying the content to offset the at least the portion of the amount of reflection comprises modifying at least one of a contrast level associated with the content to be displayed, a brightness level associated with the content to be displayed, or a display size associated with the content to be displayed.

14. The computer-implemented method of claim 6, further comprising:
detecting a background lighting condition associated with an environment in which the computing device is situated; and
modifying the displaying the content based on the background lighting condition.

15. A computing device comprising: a display screen; at least one variable tactile element associated with the display screen; a processor; and a memory device including instructions that, when executed by the processor, cause the computing device to: access information about the at least one variable tactile element, the information indicating at least one of a location, a size, or a shape of the at least one variable tactile element; and display content to correct for at least a portion of an optical distortion caused by the at least one variable tactile element when activated, and the displaying being based at least in part on the information about the at least one variable tactile element: one or more sensors configured to facilitate in determining an orientation of the computing device with respect to a user of the computing device, wherein the displaying the content is further based in part on the orientation of the computing device.

16. The computing device of claim 15, wherein the one or more sensors comprise at least one of a camera configured to track a position of a feature of the user, an acoustic location sensor configured to acoustically locate the position of the feature of the user, a gyroscope configured to capture orientation information about the computing device, or an accelerometer configured to capture orientation information about the computing device.

17. The computing device of claim 15, wherein the at least one variable tactile element associated with the display screen is included with at least one of an interface layer overlaying the display screen or an interface layer integrated with the display screen.

18. A non-transitory computer-readable storage medium including instructions for identifying elements, the instructions when executed by a processor of a computing device causing the computing device to: access information about at least one variable tactile element associated with a display of the computing device, the information indicating at least one of a location, a size, or a shape of the at least one variable tactile element; and display content to correct for at least a portion of an optical distortion caused by the at least one variable tactile element when activated, and the displaying being based at least in part on the information about the at least one variable tactile element; wherein the instructions cause the computing device to further determine an orientation of the computing device with respect to a user of the computing device, wherein the displaying the content is further based in part on the orientation of the computing device.

* * * * *